United States Patent
Rahmathali et al.

(10) Patent No.: US 10,761,817 B2
(45) Date of Patent: Sep. 1, 2020

(54) SYSTEM AND METHOD FOR FACILITATING AN INSTANCE-SPECIFIC USER INTERFACE

(71) Applicant: Pershing LLC, Jersey City, NJ (US)

(72) Inventors: FathimaFazlina Rahmathali, Chennai (IN); Akilla Duraiswami, Chennai (IN); Laxmi Narsimham Vedula, Edison, NJ (US); Sridhar Lakshmipathy, Chennai (IN); Prasanna Sivakumar, Chennai (IN)

(73) Assignee: PERSHING LLC, Jersey City, NJ (US)

( * ) Notice: Subject to any disclaimer, the term of this patent is extended or adjusted under 35 U.S.C. 154(b) by 0 days.

(21) Appl. No.: 16/160,601

(22) Filed: Oct. 15, 2018

(65) Prior Publication Data

US 2020/0034124 A1 Jan. 30, 2020

(30) Foreign Application Priority Data

Jul. 26, 2018 (IN) .............................. 201811028077

(51) Int. Cl.
*G06F 9/44* (2018.01)
*G06F 8/38* (2018.01)

(52) U.S. Cl.
CPC ..................................... *G06F 8/38* (2013.01)

(58) Field of Classification Search
CPC ........................................................ G06F 8/38
(Continued)

(56) References Cited

U.S. PATENT DOCUMENTS

2002/0095405 A1* 7/2002 Fujiwara ............. G06F 21/6227
2005/0257157 A1 11/2005 Gilboa et al.
(Continued)

FOREIGN PATENT DOCUMENTS

WO 2015/034853 A1 3/2015

OTHER PUBLICATIONS

International Search Report & Written Opinion of the International Searching Authority dated Nov. 8, 2019 issued in corresponding International Patent Application No. PCT/US2019/043501 (12 pgs.).

*Primary Examiner* — Wei Y Zhen
*Assistant Examiner* — Lanny N Ung
(74) *Attorney, Agent, or Firm* — Pillsbury Winthrop Shaw Pittman, LLP (57) ABSTRACT

In certain embodiments, an instance-specific user interface may be facilitated via entity-associated application metadata. In some embodiments, access information associated with an entity may be provided to one or more servers via a first executable instance of a same user application during a launch of the first executable instance. Based on the access information, application metadata associated with the entity may be obtained via the first executable instance from among a set of application metadata during the launch of the first executable instance, where the application metadata indicates data fields that correspond to data accessible to the entity. Based on the application metadata, the data fields may be loaded for a user interface of the first executable instance during the launch of the first executable instance. One or more of the data fields may be presented via the user interface of the first executable instance.

21 Claims, 6 Drawing Sheets

(58) Field of Classification Search
USPC .......................................................... 717/120
See application file for complete search history.

(56) References Cited

U.S. PATENT DOCUMENTS

| | | |
|---|---|---|
| 2007/0130156 A1 | 6/2007 | Tenhunen et al. |
| 2008/0276218 A1* | 11/2008 | Taylor ...................... G06F 8/38 |
| | | 717/106 |
| 2009/0204629 A1 | 8/2009 | Barrow |
| 2010/0077449 A1* | 3/2010 | Kwok ................... G06F 9/5027 |
| | | 726/3 |
| 2016/0139754 A1* | 5/2016 | Argutin ................ G06F 3/0484 |
| | | 715/744 |
| 2017/0064004 A1 | 3/2017 | Volkmer |

* cited by examiner

| Field Description | Field Name | Numeric Field Sample | Text Field Sample |
|---|---|---|---|
| Unique field ID used for building SQL queries | parmCd | 5296 | 6178 |
| Field selection type | controlType | TEXT | COMB |
| Is the field a mandatory input? (Y/N) | inputMandatoryInd | N | N |
| Is the field mandatory in the output? (Y/N) | outputMandatoryInd | N | N |
| Field category / grouping | subCategory | PNAM | ACNT |
| Parent code. These are parent fields | parentParmCd | | |
| Text shown when the mouse hovers over the field | toolTip | [#] | [Sample] |
| Name-value pair consists of display value along with database code or blank for text input | dropDownValue | | Choice 1::::1~.~Choice 2::::2~.~Choice 3::::3~.~ALL::::0 |
| DB Validation Type If numeric will use operators of =, >=,<=, <, or >. Text will provide a list. | validationValue | OPERATOR_TYPE:::NUMERIC | MAXMULTISELECT:::10 |
| Is field allowed for input? (Y/N) | isInput | Y | Y |
| Is field allowed for output? (Y/N) | isOutput | Y | Y |
| Allow multiple selections? (Y/N) | isMultiple | N | Y |
| Certain fields are in multiple categories and used for table joins | isCommon | N | N |
| Can this field be used for grouping? | isGroupBy | N | Y |
| Non-Public Personal Information | isNPPI | N | N |
| Data Summarization options | summarizedBy | MIN:AVG:COUNT:MAX:SUM | |
| Field definitions used for formatting | backendFieldType | NUMBER(20, 3) | CHAR(39) |

FIG. 3A

| Primary Parent | Secondary Parent | Join Condition | Join Fields |
|---|---|---|---|
| VEAN_DTLS | VEAN_CPB | LEFT JOIN | UID,PRD |
| VEAN_DTLS | VEAN_OPEN_ITEMS | LEFT JOIN | UID,PRD |
| VEAN_DTLS | VEAN_RSN_CODES | INNER JOIN | UID,PRD |
| VEAN_DTLS | VEAN_CMNT | LEFT JOIN | UID,PRD |
| VEAN_DTLS | VEAN_PAHT | INNER JOIN | UID,PRD |

SYSTEM AND METHOD FOR FACILITATING AN INSTANCE-SPECIFIC USER INTERFACE

CROSS-REFERENCE TO RELATED APPLICATIONS

This Application claims priority to Indian Patent Application No. 201811028077, filed Jul. 26, 2018, the subject matter of which is incorporated herein by reference in entirety.

FIELD OF THE INVENTION

The invention relates to user interface flexibility across multiple instances of an application, including, for example, facilitating an instance-specific user interface via entity-associated application supplemental information, generating a report via the specific user interface of an executable instance of an application, etc.

BACKGROUND OF THE INVENTION

User application software (also referred to as an application) is generally designed to provide a user with a set of user interface features explicitly coded into the application. Although some of the user interface features may be "locked," "unlocked," or otherwise made available or unavailable to a user via one or more application settings, all such user interface features are traditionally coded into the application. To add user interface features or modify the user interface features of an application, the source code of the application must typically be changed to accommodate the new/modified user interface features. When new code is introduced in an application, a significant amount of time and effort is generally required to ensure the integrity of the resulting application, which brings significant barriers in terms of productivity, and can propagate errors throughout a code base in an unpredictable fashion. These and other drawbacks exist.

SUMMARY OF THE INVENTION

Aspects of the invention relate to methods, apparatuses, and/or systems for providing a metadata-configurable user interface or other user interface (e.g., configurable via other supplemental information) to enable user interface flexibility across multiple instances of an application. As an example, an instance of an application (and/or a computer program thereof) may be supplemented with user interface features, e.g., without having to modify the application code of the application (and/or without having to recompile such application code to recreate an "updated" version of the executable).

In some embodiments, multiple instances of the same application may be hosted on different computer systems, and each application instance may be configured to present a specific user interface different from others user interfaces of one or more other application instances via the supplemental information provided for each application instance. That is, in some embodiments, specialization of a user interface of each application instance (e.g., an executable instance hosted on each of the different computer systems) may be achieved by accessing supplemental information without the need to modify the application (or instance thereof) (e.g., reprogramming the source code and/or recompiling the source code of the executable instance), thereby avoiding traditional integration and software deployment issues. In some embodiments, an application instance may utilize supplemental information (e.g., application metadata) as at least part of its working memory at runtime to provide the specific user interface.

In some embodiments, first supplemental information may be associated with a first entity (that is using a first application on a first client system), second supplemental information may be associated with a second entity (that is using a second application on a second client system), (iii) third supplemental information may be associated with a third entity (that is using a third application on a third client system), and so on. As an example, each of the foregoing applications may be an instance of the same application, such as a version of the same application, a copy of the same application, etc. Each of the supplemental information may indicate data fields (e.g., that correspond to data accessible to the respective entity) or other user interface features (e.g., user interface features accessible to the respective entity).

In some embodiments, a server system may determine the supplemental information associated with the respective entity (e.g., an individual, a group, an organization, or other entity). The server system may provide the respective supplemental information to the respective client systems, where the supplemental information causes a respective set of data fields (e.g., data fields corresponding to data accessible to the entity or other data fields) or other user interface features to be loaded for the user interface of the application of the client system. As an example, when the first supplemental information is provided to the first client system, the first supplemental information causes a first set of data fields (corresponding to data accessible to the first entity) to be loaded for the user interface of the first application. When the second supplemental information is provided to the second client system, the second supplemental information causes a second set of data fields (corresponding to data accessible to the second entity) to be loaded for the user interface of the second application. In this way, for example, each of the user interfaces of the different applications may be loaded with a different set of data fields, thereby enabling each user interface to be specific to each "instance" on a computer system (or to each entity using the respective instance).

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
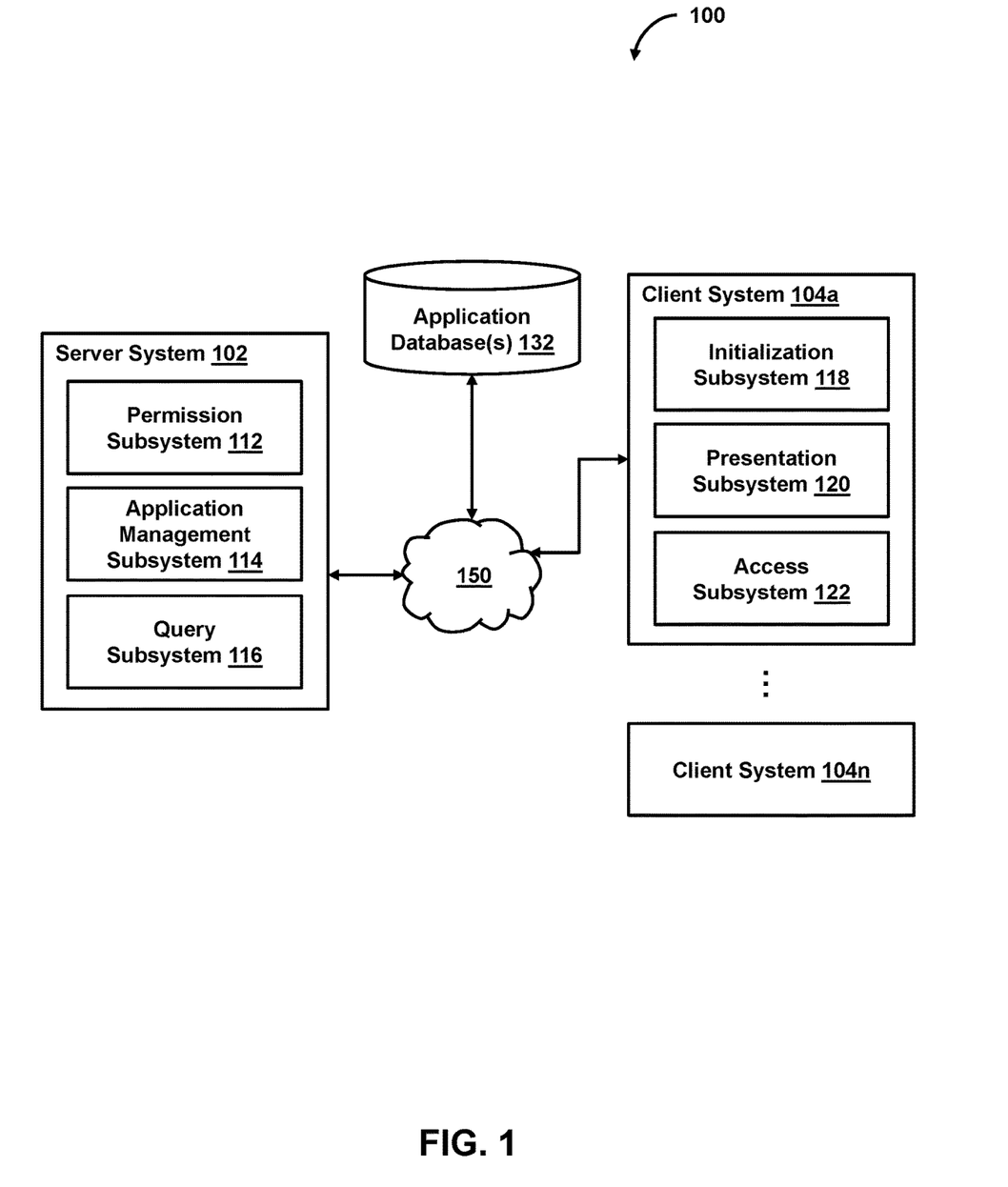
FIG. 1 shows a system for facilitating user interface configuration, in accordance with one or more embodiments.

FIG. 1 shows system 100 for facilitating user interface configuration, in accordance with one or more embodiments. As shown in FIG. 1, system 100 may include server system 102, client systems 104 (or client systems 104a-104n), or other components. Server system 102 may include permission subsystem 112, application management subsystem 114, query subsystem subsystem 116, or other components. Client system 104 may include initialization subsystem 118, presentation subsystem 120, access subsystem 122, or other components. Each client system 104 may be a cloud client system or a client device. A client device may include any type of mobile terminal, fixed terminal, or other device. By way of example, client system 104 may include a desktop computer, a notebook computer, a tablet computer, a smartphone, a wearable device, or other client system. Users may, for instance, utilize one or more client systems 104 to interact with one another, server system 102, or other components of system 100. It should be noted that, while one or more operations are described herein as being performed by particular components of server(s) 102, those operations may, in some embodiments, be performed by other components of system 100. As an example, while one or more operations are described herein as being performed by components of server system 102, those operations may, in some embodiments, be performed by components of client system 104.

DESCRIPTION OF EXAMPLE SYSTEMS

In some embodiments, a metadata-configurable user interface or other user interface (e.g., configurable via other supplemental information) may be provided to enable user interface flexibility across multiple instances of an application. As an example, multiple instances of the same application (e.g., a report generation or other application) may be hosted on different computer systems, and each application instance may be configured to present a specific user interface different from others user interfaces of one or more other application instances via the supplemental information provided for each application instance. That is, in some embodiments, specialization of a user interface of each application instance (e.g., an executable instance hosted on each of the different computer systems) may be achieved by accessing supplemental information without the need to modify the application (or instance thereof) (e.g., reprogramming the source code and/or recompiling the source code of the executable instance), thereby avoiding traditional integration and software deployment issues. In some embodiments, an application instance may utilize supplemental information (e.g., application metadata) as at least part of its working memory at runtime to provide the specific user interface.

Figure 3A:
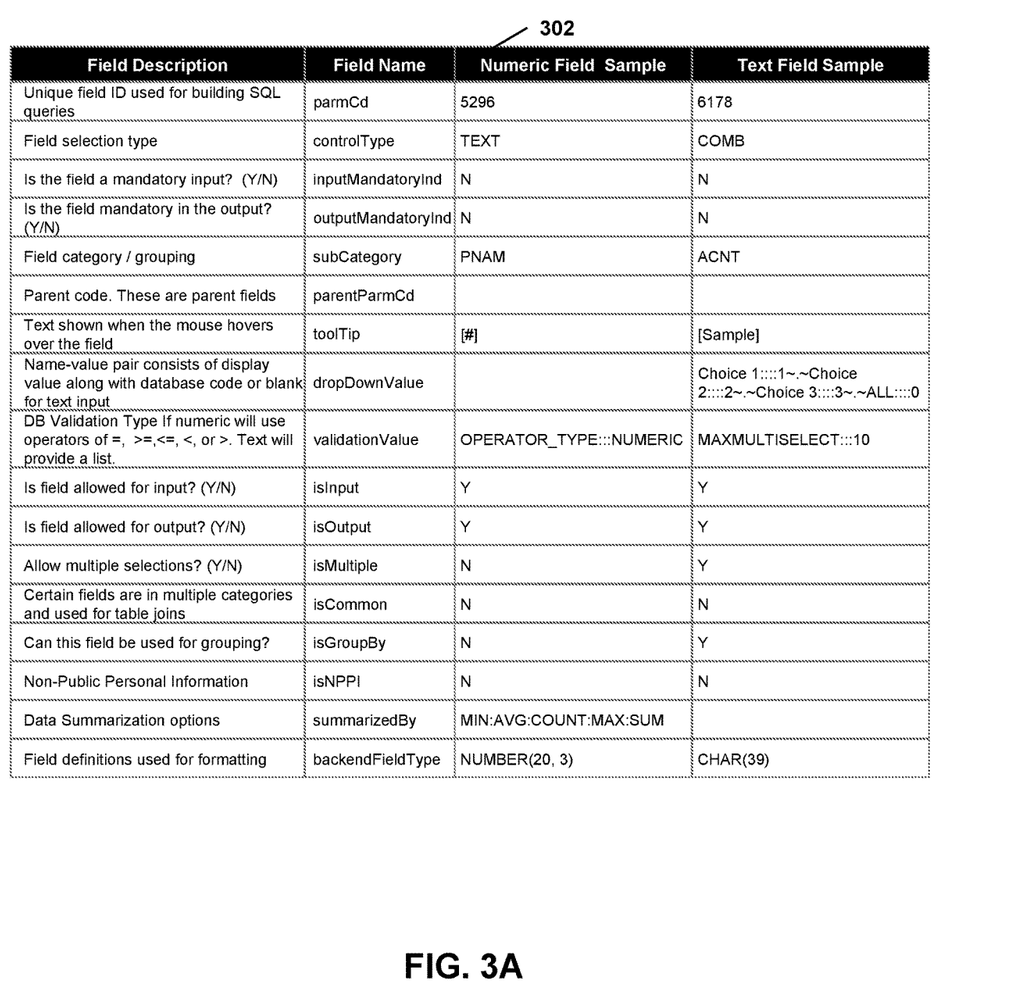
FIGS. 3A-3B show table stored in one or more databases from which application metadata can be derived, in accordance with one or more embodiments.

In some embodiments, system 100 may determine (i) first supplemental information associated with a first entity (that is using a first application on a first client system), (ii) second supplemental information associated with a second entity (that is using a second application on a second client system), (iii) third supplemental information associated with a third entity (that is using a third application on a third client system), and so on. As an example, each of the foregoing applications may be an instance of the same application, such as a version of the same application, a copy of the same application, etc. Each of the supplemental information may indicate data fields (e.g., that correspond to data accessible to the respective entity) or other user interface features (e.g., user interface features accessible to the respective entity). Additionally, or alternatively, each of the supplement information may include one or more definitions associated with data fields (or other user interface features), such as a data type associated with a data field, an operator type associated with a data field, one or more thresholds (e.g., a minimum number of items to be selected, a maximum number of items to be selected, etc.), or other definitions. As an example, with respect to FIG. 3A, representation 302 specifies metadata with respect to one or more data fields, showing metadata definitions associated with categories and data fields.

In some embodiments, system 100 may obtain (i) first access information associated with the first entity from the first client system via the first application, (ii) second access information associated with the second entity from the second client system via the second application, (iii) third access information associated with the third entity from the third client system via the third application, and so on. Based on the respective access information, system 100 may determine the supplemental information associated with the respective entity. As an example, each such entity may be an individual, a group, an organization, or other entity. The access information may include an identifier identifying a user or other entity, an identifier identifying the client system (e.g., a device identifier), an access token corresponding to the user or other entity, a password associated with an account of the user or other entity, or other access information. The supplemental information may be stored in association with the access information, and the access information may be used to obtain the supplemental information from one or more databases (e.g., application databases 132).

System 100 may provide the respective supplemental information to the respective client systems, where the supplemental information causes a respective set of data fields (e.g., data fields corresponding to data accessible to the entity or other data fields) or other user interface features to be loaded for the user interface of the application of the client system. As an example, when the first supplemental information is provided to the first client system, the first supplemental information causes a first set of data fields (corresponding to data accessible to the first entity) to be loaded for the user interface of the first application. When the second supplemental information is provided to the second client system, the second supplemental information causes a second set of data fields (corresponding to data accessible to the second entity) to be loaded for the user interface of the second application. When the third supplemental information is provided to the third client system, the third supplemental information causes a third set of data fields (corresponding to data accessible to the third entity) to be loaded for the user interface of the third application. In this way, for example, each of the user interfaces of the different applications may be loaded with a different set of data fields, thereby enabling each user interface to be specific to each "instance" on a computer system (or to each entity using the respective instance).

In some embodiments, system 100 may obtain one or more requests for one or more data fields to be made accessible to an entity (e.g., while the entity or a user associated therewith is using an application). System 100 may generate supplemental information associated with the entity based on (i) the request, (ii) one or more permissions associated with the entity, and (iii) or other information such that the supplemental information is generated to indicate loading of at least one of the data fields based on the request, but does not indicate at least another one of the data fields (as a data field to be loaded at application launch) based on the entity not having access to at least some data corresponding to the other data field. As an example, the request may include access information associated with the entity, and the access information may be used to identify the entity's permissions with respect to data in one or more databases. If it is determined that the entity does not have permission to access certain data that a given data field corresponds, the given data field may not be indicated in the generated supplemental information. In this way, for example, a user of the application (for which the supplemental information is loaded) will not be presented with such data fields that, if used by the user to attempt to retrieve the corresponding data, would return an access denial or other error. Additionally, or alternatively, the avoidance of such data fields (e.g., by not indicating such data fields in the supplemental information as data fields to be loaded at application launch) reduces the number of data fields that may be presented to a user and prevents the user from being inundated with options that are not actually available to the user (e.g., because the user does not have access to data corresponding to such data fields).

In some embodiments, a computer system (e.g., one of client systems 104) may obtain supplemental information associated with an entity via an application (e.g., an executable instance of the application) from among a set of supplemental information (e.g., stored in application databases 132). In some embodiments, the computer system may provide access information associated with the entity (e.g., over a network to one or more servers). Based on the access information being provided, the computer system may obtain the supplemental information (e.g., from the servers over a network). As an example, the supplemental information may indicate data fields that correspond to data accessible to the entity (or other user interface features). Based on the supplemental information, the computer system may load the data fields (or the other user interface features) for a user interface of the application and present at least one of the data fields (or other features) via the user interface. In some embodiments, the data fields are loaded for the user interface of the application without any other user application hosted on the computer system specifying the data fields as a set of data fields to be loaded for the user interface of the application. In some embodiments, one or more of the providing of the access information, the obtainment of the supplemental information, the loading of the data fields (e.g., into the application for the user interface), or other operations may be performed during a launch of the application. As such, for example, changes to the features of the user interface may be implemented for the user without interrupting a user's use of the application. In some embodiments, the foregoing operations may be automatically performed responsive to the application launch being initiated (e.g., without any further user input indicating performance of such operations subsequent to the application launch being triggered via user activation or other input indicating that the application be executed).

It should be noted that, although some embodiment describe the foregoing operations as being performed during the launch of the application, one or more of such operations may be performed at other stages (e.g., during termination of the application, between the launch and the termination processes, initiated during the launch and continued to be performed during runtime of the application, while the application is running as a background process, etc.). As an example, in some cases, the providing of the access information or the obtainment of the supplemental information during the termination of the application (or during detected idle times during the application's runtime) in lieu of performing such operations at application launch to increase the speed at which the application is launched and ready for use by the user (e.g., by avoiding delays associated with such operations at application launch). In such cases, the most-recently-obtained supplemental information associated with an entity may be stored in local memory, and, at the next application launch by the entity, the supplemental information may be obtained from local memory to load the data fields (or other features indicated by the supplemental information) for the user interface of the application.

Figure 2:
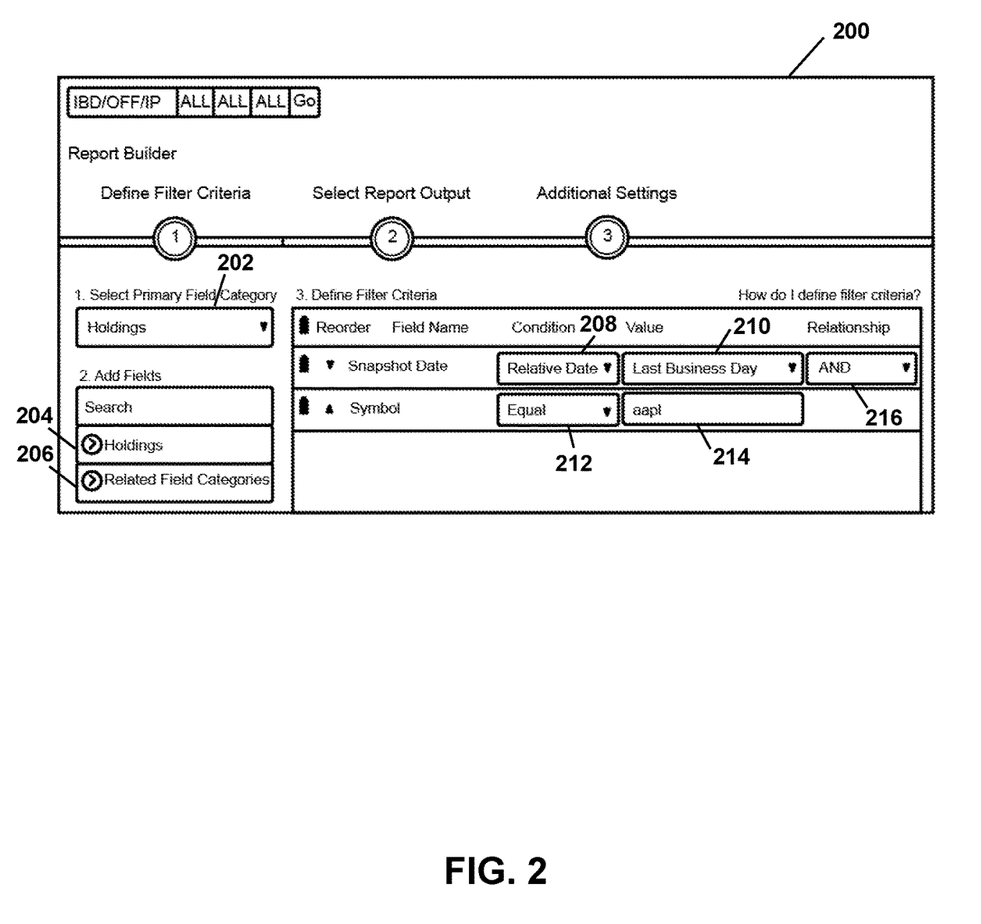
FIG. 2 show a user interface configurable via application metadata (or other supplemental information), in accordance with one or more embodiments.

As an example, with respect to FIG. 2, user interface 200 includes drop down menus 202-216 or other components. Each of the drop down menus 202-216 may include one or more data fields, at least some of which may be customized via supplemental information (e.g., application metadata) that is obtained from one or more databases (e.g., over a network from application databases 132) and loaded for user interface 200 at application launch (or other application state triggering the obtainment or loading of the data fields). In one use case, a user may select one or more of the data fields of drop down menus 202-216 to generate a report. A selected data field (or a combination of data fields) may correspond to a data calculation, a query operation, or other operation. For example, when the user submits a request to generate a report based on the selected data fields, such corresponding operations may be invoked by query subsystem 116 (or other components of system 100) to obtain the results for the report. A data calculation operation may include one or more statistical or other mathematical calculations on data retrieved via one or more queries (e.g., data that correspond to the parameters of the data calculation and are stored in tables or other data sources). A query operation may include one or more queries or query operators (e.g., a join condition to join data that correspond to the parameters of the query operation and are stored in table or other data sources).

In another use case, with respect to FIG. 2, a product owner (e.g., an administrator or other user of the application) may submit a request to change data fields (e.g., field names or other values), add data fields, or remove data fields. Based on the request, the requested actions may be performed to a set of supplemental information (associated with the product owner) stored in one or more databases. Upon the next application launch (or other designated application state), the set of supplemental information modified by the requested actions may be obtained and provided as input to the application to cause the data fields indicated by the supplemental information to be loaded for user interface 200. In this way, for example, the modifications with respect to the data fields available via user interface 200 may be effectuated without the need to make user interface or application coding changes.

In some embodiments, permission subsystem 112 may obtain access information associated with an entity (e.g., an individual, a group, an organization, or other entity) from a client system (e.g., one of the client systems 104). Based on the access information, permission subsystem 112 may determine one or more permissions of the entity. Such permissions may include information indicating which set of supplement information (e.g., application metadata indicating data fields or other user interface features to be loaded) the entity is permitted to download, the data access rights associated with the entity (e.g., access levels of the entity, the specific data sources the entity is permitted to access, the specific types of data the entity is permitted to access, etc.), or other permissions. The access information may include an identifier identifying the entity, an identifier identifying the client system (e.g., a device identifier), an access token corresponding to the entity, a password associated with an account of the entity, or other access information. As an example, permission subsystem 112 may obtain the access information from an application at the client system responsive to the entity (or a user thereof) logging into the application. Permission subsystem 112 may perform validation of the access information and authenticate the entity/user upon determining that the access information is valid.

Application management subsystem 114 may determine supplemental information associated with the entity (e.g., based on the access information, the permissions, or other information associated with the entity). As an example, the supplemental information may indicate data fields (e.g., that correspond to data accessible to the entity) or other user interface features (e.g., user interface features accessible to the entity). Additionally, or alternatively, the supplement information may include one or more definitions associated with data fields (or other user interface features), such as a data type associated with a data field, an operator type associated with a data field, one or more thresholds, or other definitions. In some embodiments, the supplemental information may be stored in association with the access information (e.g., in application databases 132), and application management subsystem 114 may use the access information to obtain the supplemental information from one or more databases (e.g., application databases 132).

Figure 3B:
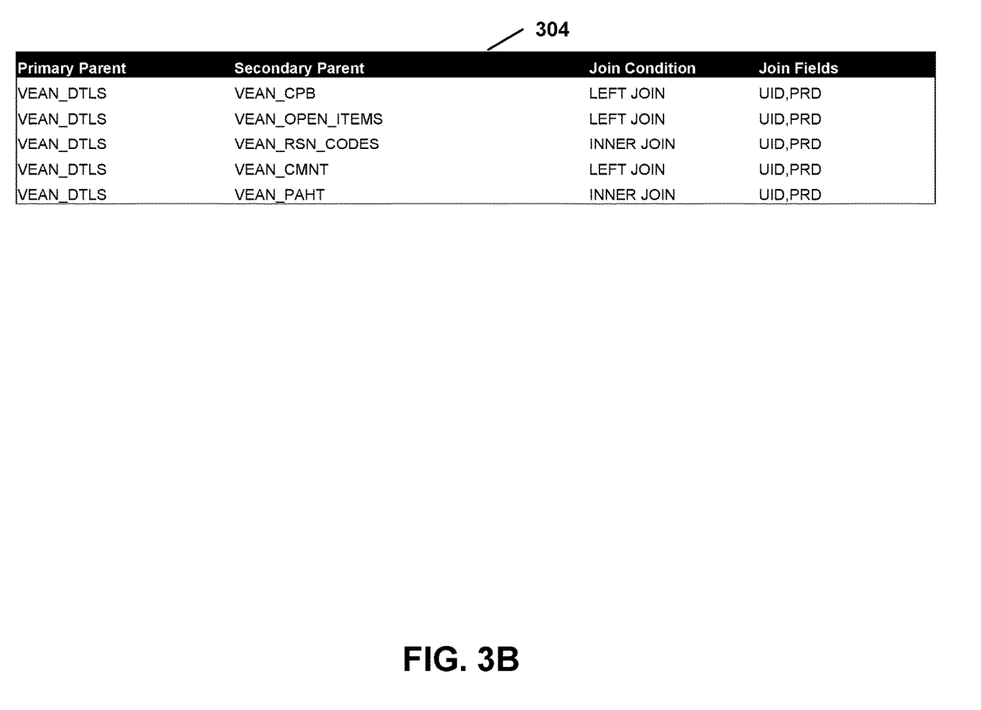

In some embodiments, the entity may submit a request for one or more data fields or other user interface features. As an example, application management subsystem 114 may obtain the request for the user interface features and generate the supplement information (e.g., indicating at least some of the requested features) for the entity based on the entity having access to data corresponding to the indicated requested features. In one use case, with respect to FIG. 3B, representation 304 specifies metadata with respect to one or more data fields, showing that the Account Details table (listed under Primary Parent) can be joined to the tables in the Secondary Parent column with an inner or left join using the fields User ID (or UID) and Product (or PRD). If a requested data field corresponds to data from the VEAN_DTLS table, and the requesting entity has access to the VEAN_DTLS table, then supplemental information generated for the entity may indicate the requested data field as a data field to be loaded at application launch (or other application state).

As another example, the supplemental information may not indicate that at least one requested data field (or other user interface feature) is to be loaded at application launch (or other designated application state) based on the entity not having access to at least some data corresponding to the requested feature. When the supplemental information is provided as input to the application at the designated application state, the supplement information causes the application to load the data fields (indicated by the supplemental information) for user interface 200. Because the supplement information does not specify a given requested feature (e.g., a data field) as a feature to be loaded, the application does not load the given requested feature at application launch, thereby avoiding loading a feature corresponding to data for which the entity does not have the appropriate access rights. In one scenario, with respect to FIG. 3B, if a requested data field corresponds to data from the VEAN_DTLS table, and the requesting entity does not have access to the VEAN_DTLS table, then supplemental information generated for the entity may indicate the requested data field as a data field to be loaded at application launch (or other application state). Thus, when the supplemental information is used to load one or more data fields for the user interface of the entity's application, the application may not load the requested data field. As such, the application avoids loading a data field that, if selected by the entity (e.g., to generate a report), would return "null" (or another error indication) due to the entity failing to have the appropriate access rights to data corresponding to the data field.

As a further example, if the entity does not have access to data corresponding to at least one parameter required by an operation to which a requested data field corresponds, the supplemental information generated for the entity may not indicate that the requested data field is to be loaded at application launch or other designated application state. Such operation may include a data calculation requiring the parameter, a query operation requiring the parameter (e.g., a query operation involving a join of data from two or more data sources), or other operation. In one use case, with respect to FIG. 3B, if a requested data field corresponds to a query operation (e.g., with an inner or left join) requiring data from the VEAN_DTLS table and data from the VEAN_CPB table, but the requesting entity does not have access to at least one of the two tables, supplemental information generated for the entity may not indicate the requested data field as a data field to be loaded at application launch (or other application state). In a further use case, when the supplemental information is used to load one or more data fields for the user interface of the entity's application, the application may not load the requested data field. In this way, for example, the application avoids loading a data field that, if selected by the entity (e.g., to generate a report), would return "null" (or another error indication) due to the entity failing to have the appropriate access rights to data corresponding to a parameter required by the query operation. Additionally, or alternatively, because the data field cannot be selected by the entity via the application (as configured by the supplemental information), execution of one or more queries of the query operation (corresponding to the data field) may be avoided, thereby saving computational resources through the configured application.

As yet another example, the supplemental information may not indicate that at least one requested data field (or other user interface feature) is to be loaded at application launch (or other designated application state) based on one or more satisfiability issues for data corresponding to the requested data field. In one scenario, for example, columns in the tables may be mapped to primitive values in the graph (e.g., integer, string, date, etc.). If a query operation attempts to join two incompatible types (e.g., integer and date) from two tables, such an attempt will fail (in this scenario). As such, if it is determined that such data types will be used to respectively store two sets of data corresponding to a requested data field, query subsystem 116 may provide an indication of the satisfiability issue (e.g., the failure to join the two incompatible types) to application management subsystem 114. Based on the satisfiability issue, application management subsystem may generate the supplemental information so that the generated supplemental information does not indicate that the requested data field is to be loaded at application launch. In a further scenario, when the supplemental information is used to load one or more data fields for the user interface of the entity's application, the application may not load the requested data field. In this way, for example, the application avoids loading a data field that, if selected by the entity (e.g., to generate a report), would return "null" (or another error indication) due to the incompatibility of the data types corresponding to the data field. Additionally, or alternatively, because the data field cannot be selected by the entity via the application (as configured by the supplemental information), execution of one or more queries of the query operation (corresponding to the data field) may be avoided, thereby saving computational resources through the configured application.

In some embodiments, during a launch of a first instance of an application, initialization subsystem 118 (e.g., incorporated in or associated with the first application instance hosted on one of the client systems 104) may obtain supplemental information (e.g., application metadata) associated with an entity from among a set of supplemental information and cause loading of one or more data fields for a user interface of the first application instance based on the supplemental information. Presentation subsystem 120 (incorporated in or associated with the first application instance) may present one or more of the loaded data fields via the user interface of the first application instance. As discussed herein, the supplemental information may indicate the data fields to be loaded. As an example, the supplement information may include one or more definitions associated with such data fields (e.g., a data type associated with a data field, an operator type associated with a data field, a threshold associated with a data field, or other definitions) or other information indicating the data fields to be loaded. Initialization subsystem 118 may utilize such definitions to load the data fields for the user interface of the first application instance during the launch of the first application instance.

In some embodiments, during a launch of a second instance of the application, initialization subsystem 118 (e.g., incorporated in or associated with the second application instance hosted on another one of the client systems 104) may obtain other supplemental information (e.g., associated with another entity) and cause loading of one or more data fields for a user interface of the second application instance based on the other supplemental information. As an example, at least one data field of the data fields loaded for the user interface of the first application instance is not loaded for the user interface the second application instance based on the other supplemental information being used to load a set of data fields for the user interface of the second application instance. In one scenario, the other supplemental information that is provided for the second application instance may not indicate one or more data fields that are loaded for the first application instance as data fields to be loaded (e.g., the supplemental information may include no definition of such data fields or explicitly specifies that such data fields are not to be loaded). In a further scenario, the other supplemental information may be generated based on one or more permissions of the other entity associated with the second application instance. For example, the other supplemental information (provided for the second application instance) may not indicate one or more data fields (that are loaded for the first application instance) based on the other entity not having access to data corresponding to such data fields (e.g., the other entity does not have the appropriate access rights to such corresponding data).

In some embodiments, during a launch of a first instance of an application, access subsystem 122 (e.g., incorporated in or associated with the first application instance hosted on one of the client systems 104) may provide access information associated with an entity to one or more servers (e.g., server systems 102) via the first application instance. As an example, the access information may include an identifier identifying a user or other entity associated with a first computer system (e.g., one of the client systems 104), an identifier identifying the first computer system (e.g., a device identifier), an access token corresponding to the user or other entity, a password associated with an account of the user or other entity, or other access information. Based on providing the access information, initialization subsystem 118 may obtain supplemental information associated with the entity via the first application instance. As discussed above, initialization subsystem 118 may cause loading of one or more data fields for a user interface of the first application instance based on the supplemental information. As an example, the data fields may be loaded to one or more memory regions associated with the first application instance for use by the user interface (e.g., a cache or other memory region designated by the first computer system to the first application instance for an application session). As a further example, when one or more user interactions with the user interface triggers presentation of one or more of the data fields on the user interface, such data fields may be obtained from the memory regions and presented on the user interface. As another example, the user interface may be pre-populated with one or more of the data fields during the launch of the first application instance and presented on the user interface.

Example Flowcharts

Figure 4:
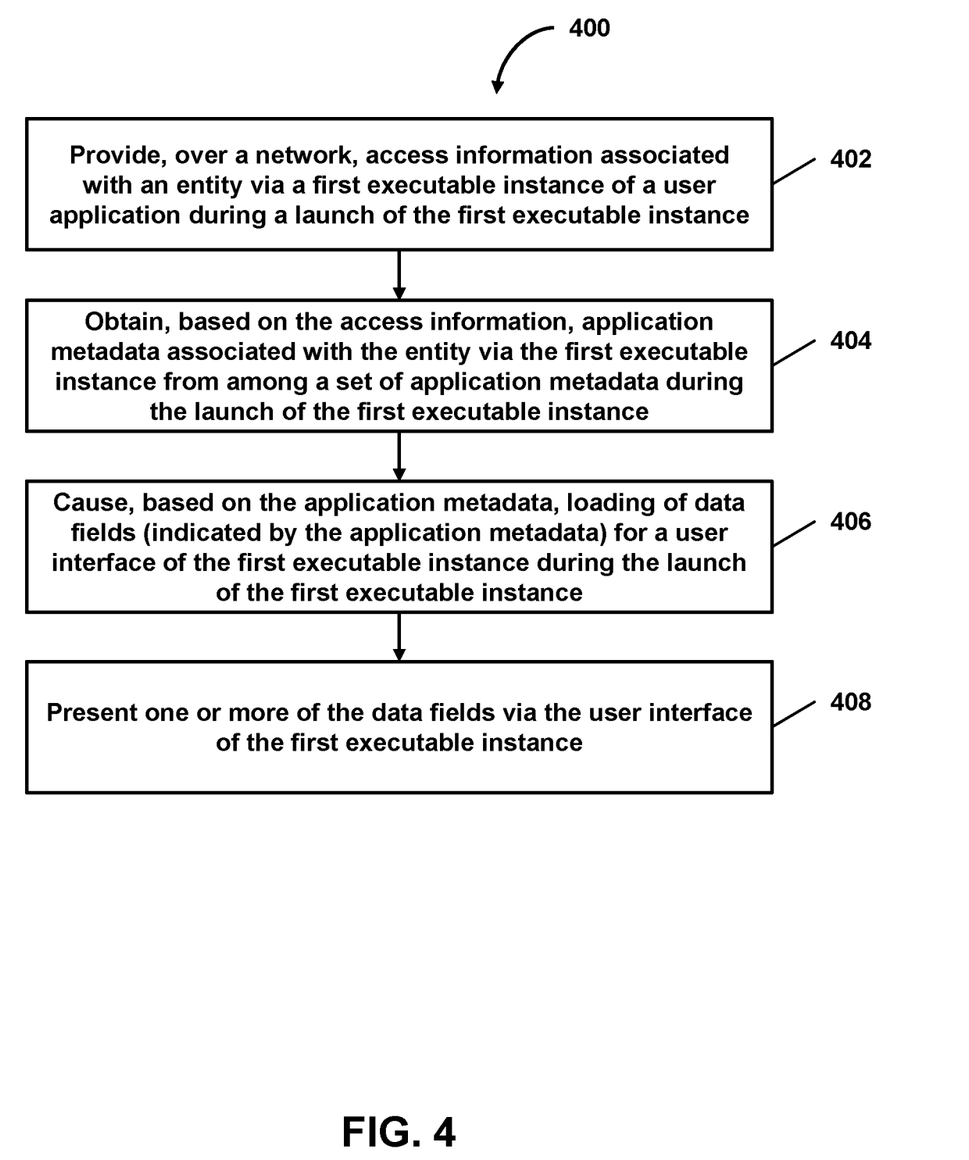
FIG. 4 shows a flowchart of a method of facilitating an instance-specific user interface, in accordance with one or more embodiments.
Figure 5:
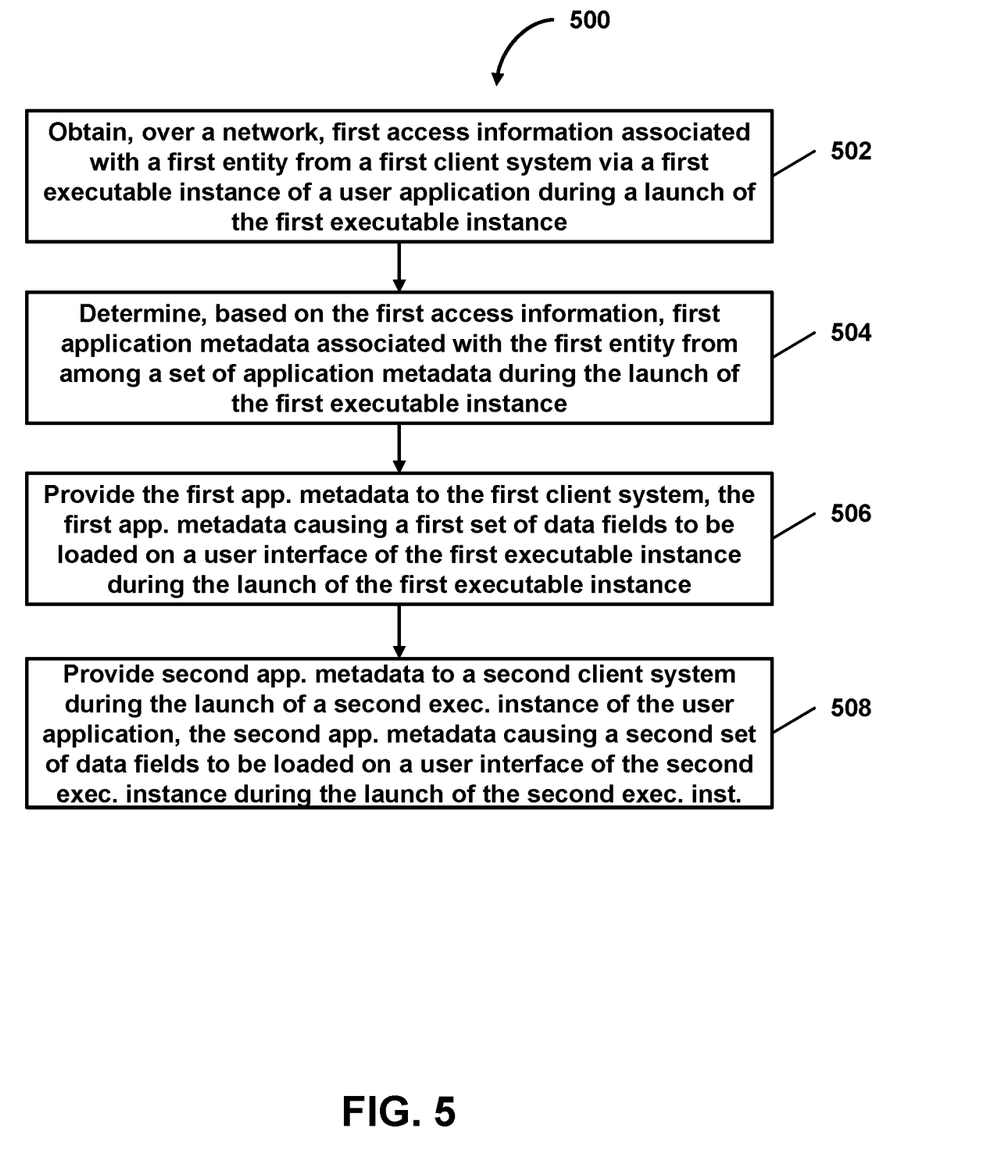
FIG. 5 shows a flowchart of a method of providing different application metadata to different executable instances of a user application to facilitate instance-specific user interfaces, in accordance with one or more embodiments.

FIGS. 4-5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 4 shows a flowchart of a method 400 of facilitating an instance-specific user interface, in accordance with one or more embodiments. In an operation 402, access information associated with an entity (e.g., an individual, a group, an organization, or other entity) may be provided over a network via a first executable instance of a user application during a launch of the first executable instance. As an example, the access information may include an identifier identifying a user or other entity associated with a first computer system (e.g., one of the client systems 104), an identifier identifying the first computer system (e.g., a device identifier), an access token corresponding to the user or other entity, a password associated with an account of the user or other entity, or other access information. As another example, the first executable instance may be one instance of multiple executable instances (of the user application) that are hosted on different computer systems. Operation 402 may be performed by a subsystem that is the same as or similar to access subsystem 122 (e.g., of the first executable instance or other component of client system 104), in accordance with one or more embodiments.

In an operation 404, application metadata associated with the entity may be obtained over the network via the first executable instance based on the access information (e.g., based on the access information being provided to one or more servers) during the launch of the first executable instance. As an example, the application metadata may be obtained over the network from among a set of application metadata during the launch of the first executable instance. The set of application metadata may include the application metadata and other application metadata (e.g., associated with another entity). In one use case, the application metadata may indicate data fields that correspond to data accessible to the entity, and the other application metadata may indicate other data fields that correspond to data accessible to the other entity (e.g., where one or more of such other data fields correspond to data that is not accessible to the entity). Operation 404 may be performed by a subsystem that is the same as or similar to initialization subsystem 118 (e.g., of the first executable instance or other component of client system 104), in accordance with one or more embodiments.

In an operation 406, the data fields may be loaded for a user interface of the first executable instance based on the application metadata during the launch of the first executable instance. As an example, the data fields may be loaded to one or more memory regions associated with the first executable instance for use by the user interface (e.g., a cache or other memory region designated by the first computer system to the first executable instance for an application session). As a further example, when one or more user interactions with the user interface triggers presentation of one or more of the data fields on the user interface, such data fields may be obtained from the memory regions and presented on the user interface. As another example, the user interface may be pre-populated with one or more of the data fields during the launch of the first executable instance and presented on the user interface. Operation 406 may be performed by a subsystem that is the same as or similar to initialization subsystem 118 (e.g., of the first executable instance or other component of client system 104), in accordance with one or more embodiments.

In an operation 408, one or more of the data fields may be presented via the user interface of the first executable instance. As discussed, for example, when one or more user interactions with the user interface triggers such presentation, one or more of the data fields may be obtained from local memory of the first computer system and presented on the user interface. Operation 408 may be performed by a subsystem that is the same as or similar to presentation subsystem 120 (e.g., of the first executable instance or other component of client system 104), in accordance with one or more embodiments.

FIG. 5 shows a flowchart of a method 500 of providing different application metadata to different executable instances of a user application to facilitate instance-specific user interfaces, in accordance with one or more embodiments. In an operation 502, first access information associated with a first entity (e.g., an individual, a group, an organization, or other entity) may be obtained from a first client system via a first executable instance of a user application during a launch of the first executable instance. As an example, the first access information may include an identifier identifying a first user or other entity associated with the first client system, an identifier identifying the first client system (e.g., a device identifier), an access token corresponding to the first user or other entity, a password associated with an account of the first user or other entity, or other access information. As another example, the first executable instance may be one instance of multiple executable instances (of the user application) that are hosted on different computer systems. Operation 502 may be performed by a subsystem that is the same as or similar to permission subsystem 112, in accordance with one or more embodiments.

In an operation 504, first application metadata associated with the first entity may be determined based on the first access information during the launch of the first executable instance. As an example, the first application metadata may be obtained from among a set of application metadata based on the first access information during the launch of the first executable instance. The first application metadata may indicate a first set of data fields that correspond to data accessible to the first entity. Operation 504 may be performed by a subsystem that is the same as or similar to application management subsystem 114, in accordance with one or more embodiments.

In an operation 506, the first application metadata may be provided to the first client system. By providing the first application metadata, the first application metadata may cause the first set of data fields to be loaded for a user interface of the first executable instance during the launch of the first executable instance. As an example, during the launch of the first executable instance, the first executable instance may be configured to process the first application metadata as input, identify the data fields of the first set, and load the data fields of the first set to one or more memory regions associated with the first executable instance for use by the user interface. As a further example, when one or more user interactions with the user interface triggers presentation of one or more of the data fields on the user interface, such data fields may be obtained from the memory regions and caused to be presented on the user interface. As another example, the user interface may be pre-populated with one or more of the data fields during the launch of the first executable instance and presented on the user interface. Operation 506 may be performed by a subsystem that is the same as or similar to application management subsystem 114, in accordance with one or more embodiments.

In an operation 508, second application metadata may be provided to a second client system during the launch of a second executable instance of the user application. As an example, the second application metadata may indicate a second set of data fields that correspond to data accessible to a second entity (e.g., where one or more of such other data fields correspond to data that is not accessible to the first entity). By providing the second application metadata, the second application metadata may cause the second set of data fields to be loaded for a user interface of the second executable instance during the launch of the second executable instance. As an example, during the launch of the second executable instance, the second executable instance may be configured to process the second application metadata as input, identify the data fields of the second set, and load the data fields of the second set to one or more memory regions associated with the second executable instance for use by the user interface. Operation 508 may be performed by a subsystem that is the same as or similar to application management subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., application database(s) 132 or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client systems or (ii) removable storage that is removably connectable to the servers or client systems via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client systems, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-122 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-122 described herein is for illustrative purposes, and is not intended to be limiting, as any of subsystems 112-122 may provide more or less functionality than is described. For example, one or more of subsystems 112-122 may be eliminated, and some or all of its functionality may be provided by other ones of subsystems 112-122. As another example, additional subsystems may be programmed to perform some or all of the functionality attributed herein to one of subsystems 112-122.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining, by a first computer system, supplemental information associated with an entity via a first instance of an application from among a set of supplemental information during a launch of the first application instance, the supplemental information indicating data fields that correspond to data accessible to the entity; causing, by the first computer system, based on the supplemental information, loading of the data fields for a user interface of the first application instance during the launch of the first application instance; and presenting, by the first computer system, at least one data field of the data fields via the user interface of the first application instance.

2. The method of embodiment 1, wherein the data fields are loaded for the user interface of the first application instance without any other user application hosted on the first computer system specifying the data fields as a set of data fields to be loaded for the user interface of the first application instance.

3. The method of any of embodiments 1-2, wherein at least one data field of the data fields loaded for the user interface of the first application instance is not loaded for a user interface of a second instance of the application, the at least one data field not being loaded for the user interface of the second application instance based on other supplemental information being used to load a set of data fields for the user interface of the second application instance.

4. The method of any of embodiments 1-3, wherein the supplemental information is based on one or more permissions of the entity such that the supplemental information does not indicate that a given data field is to be loaded at application launch, the given data field being a data field for which the entity does not have access to at least some corresponding data.

5. The method of any of embodiments 1-4, wherein the supplemental information is based on one or more permissions of the entity such that the supplemental information does not indicate that a given data field is to be loaded at application launch, the given data field corresponding to an operation requiring parameters for which (i) the entity has access to data corresponding to at least one of the parameters and (ii) the entity does not have access to at least another one of the parameters.

6. The method of embodiment 5, wherein the operation comprises a data calculation requiring the parameters or a query operation requiring the parameters.

7. The method of any of embodiments 5-6, wherein the given data field is not loaded for the user interface of the first application instance during the launch of the first application instance based on the supplemental information not indicating the given data field as a data field to be loaded at application launch.

8. The method of any of embodiments 1-7, further comprising: generating, by the first computer system, a request for the data fields and at least an additional data field to be made accessible to the entity, wherein the supplemental information is generated to indicate loading of the data fields based on the request, but does not indicate that the additional data field is to be loaded at application launch based on the entity not having access to data corresponding to at least one parameter required by an operation to which the additional data field corresponds.

9. The method of any of embodiments 1-8, further comprising: generating, by the first computer system, a request for the data fields and at least an additional data field to be made accessible to the entity, wherein the supplemental information is generated to indicate loading of the data fields based on the request, but does not indicate that the additional data field is to be loaded at application launch based on first and second data corresponding to first and second parameters required by a query operation being incompatible with one another, the query operation corresponding to the additional data field.

10. The method of any of embodiments 1-9, further comprising: providing, by the first computer system, access information associated with the entity to one or more servers over a network, wherein the supplemental information is obtained based on the access information during the launch of the first application instance.

11. The method of any of embodiments 1-10, wherein the first application instance is an executable instance of the application that is hosted on the first computer system.

12. The method of any of embodiments 1-11, wherein the supplemental information comprises application metadata indicating the data fields that correspond to data accessible to the entity.

13. A method comprising: obtaining first access information associated with a first entity from a first client system via a first executable instance of a user application during a launch of the first executable instance, the first executable instance being hosted on the first client system; determining, based on the first access information, first supplemental information associated with the first entity from among a set of supplemental information during the launch of the first executable instance, the first supplemental information indicating a first set of data fields that correspond to data accessible to the first entity; providing the first supplemental information to the first client system, the first supplemental information causing the first set of data fields to be loaded for a user interface of the first executable instance during the launch of the first executable instance.

14. The method of embodiment 13, further comprising: providing second supplemental information to a second client system during the launch of a second executable instance of the user application that is overlapping in time with the launch of the first executable instance, the second supplemental information indicating a second set of data fields that correspond to data accessible to a second entity, the second executable instance (i) being a different instance from the first executable instance and (ii) being hosted on the second client system, the second supplemental information causing the second set of data fields to be loaded for a user interface of the second executable instance during the launch of the second executable instance.

15. The method of any of embodiments 13-14, further comprising: obtaining a request for the data fields and at least an additional data field to be made accessible to the first entity; and generating the first supplemental information based on (i) the request and (ii) one or more permissions associated with the first entity such that the first supplemental information is generated to indicate loading of the data fields based on the request, but does not indicate that the additional data field is to be loaded at application launch based on the entity not having access to at least some data corresponding to the additional data field.

16. The method of embodiment 15, wherein the first supplemental information is generated to indicate loading of the data fields, but does not indicate that the additional data field is to be loaded at application launch based on the entity not having access to data corresponding to at least one parameter required by an operation to which the additional data field corresponds.

17. The method of embodiment 16, wherein the operation comprises a data calculation requiring the at least one parameter or a query operation requiring the at least one parameter.

18. The method of any of embodiments 13-18, further comprising: obtaining a request for the data fields and at least an additional data field to be made accessible to the first entity; and generating the first supplemental information based on (i) the request and (ii) one or more permissions associated with the first entity such that the first supplemental information is generated to indicate loading of the data fields based on the request, but does not indicate that the additional data field is to be loaded at application launch based on first and second data corresponding to first and second parameters required by a query operation being incompatible with one another, the query operation corresponding to the additional data field.

19. The method of any of embodiments 13-18, further comprising: obtaining second access information associated with the second entity via the second executable instance during the launch of the second executable instance; and determining, based on the second access information, second supplemental information associated with the second entity for the user interface of the second executable instance from among the set of supplemental information during the launch of the second executable instance.

20. The method of any of embodiments 13-19, wherein the first supplemental information comprises first application metadata indicating the first set of data fields that correspond to data accessible to the first entity, and wherein the second supplemental information comprises indicating the second set of data fields that correspond to data accessible to the second entity.

21. A tangible, non-transitory, machine-readable medium storing instructions that when executed by a data processing apparatus cause the data processing apparatus to perform operations comprising those of any of embodiments 1-20.

22. A system comprising: one or more processors; and memory storing instructions that when executed by the processors cause the processors to effectuate operations comprising those of any of embodiments 1-20.

What is claimed is:

1. A system for facilitating an instance-specific user interface via entity-associated application metadata, the system comprising:
a first computer system that comprises one or more processors programmed with computer program instructions that, when executed, cause the first computer system to:
determine that a first data field corresponds to an operation that requires a first parameter and a second parameter;
determine first data that is accessible to an entity and second data that is not accessible to the entity, wherein the first data corresponds to the first parameter and the second data corresponds to the second parameter;
obtain access information associated with the entity via a first executable instance of a same user application during a launch of the first executable instance, the first executable instance being one instance of multiple executable instances of the same user application that are hosted on different computer systems, the first executable instance being hosted on the first computer system, a second executable instance of the same user application being hosted on a second computer system different from the first computer system;
generate, based on (i) the first data being determined to be accessible to the entity, (ii) the second data being determined to not be accessible to the entity, (iii) the first data corresponding to the first parameter, (iv) the second data corresponding to the second parameter, and (v) the access information, application metadata associated with the entity from among a set of application metadata during the launch of the first executable instance, wherein:
the set of application metadata comprises the application metadata,
the application metadata indicates data fields that correspond to the first data accessible to the entity, and
the application metadata does not indicate that the first data field is to be loaded by the launch of the first executable instance based on the second data, corresponding to the second parameter, not being accessible to the entity;
cause, based on the application metadata, loading of the data fields for a user interface of the first executable instance during the launch of the first executable instance; and
cause at least one data field of the data fields to be presented via the user interface of the first executable instance.

2. The system of claim 1, wherein the data fields are loaded for the user interface of the first executable instance without any other user application hosted on the first computer system specifying the data fields as a set of data fields to be loaded for the user interface of the first executable instance.

3. The system of claim 1, wherein at least one data field of the data fields loaded for the user interface of the first executable instance is not loaded for a user interface of the second executable instance during a launch of the second executable instance, the at least one data field not being loaded for the user interface of the second executable instance during the launch of the second executable instance based on other application metadata being used to load a set of data fields for the user interface of the second executable instance, wherein the set of application metadata further comprises the other application metadata that is associated with another entity.

4. The system of claim 1, wherein the application metadata is based on one or more permissions of the entity indicated by the access information such that the application metadata does not indicate that the first data field is to be loaded during the launch of the first executable instance.

5. A method of facilitating an instance-specific user interface via entity-associated application metadata, the method comprising:
determining, by a first computer system, that a first data field corresponds to an operation requiring a first parameter and a second parameter;
determining, by the first computer system, first data that is accessible to an entity and second data that is not accessible to the entity, wherein the first data corresponds to the first parameter and the second data corresponds to the second parameter;
obtaining, by the first computer system, application metadata associated with the entity via a first application instance during a launch of the first application instance, wherein:
the application metadata is based on (i) the first data being accessible to the entity and (ii) the second data not being accessible to the entity,
the application metadata indicates data fields that correspond to the first data accessible to the entity, and
the application metadata does not indicate that the first data field is to be loaded during the launch of the first application instance;
causing, by the first computer system, based on the application metadata, loading of the data fields for a user interface of the first application instance during the launch of the first application instance; and
causing, by the first computer system, at least one data field of the data fields to be presented via the user interface of the first application instance.

6. The method of claim 5, wherein the data fields are loaded for the user interface of the first application instance without any other user application hosted on the first computer system specifying the data fields as a set of data fields to be loaded for the user interface of the first application instance.

7. The method of claim 5, wherein at least one data field of the data fields loaded for the user interface of the first application instance is not loaded for a user interface of a second instance of the application during a launch of the second application instance, the at least one data field not being loaded for the user interface of the second application instance during the launch of the second application instance based on other application metadata being used to load a set of data fields for the user interface of the second application instance.

8. The method of claim 5, wherein the application metadata is based on one or more permissions of the entity such that the application metadata does not indicate that the first data field is to be loaded during the launch of the first application instance.

9. The method of claim 5, further comprising:
obtaining, by the first computer system, access information associated with the entity,
wherein the application metadata is obtained based on the access information during the launch of the first application instance.

10. The method of claim 5, wherein the first application instance is an executable instance of an application that is hosted on the first computer system.

11. The method of claim 5, wherein the at least one data field of the data fields is not the first data field.

12. A system for facilitating an instance-specific user interface via entity-associated application metadata, the system comprising:
a computer system that comprises one or more processors programmed with computer program instructions that, when executed, cause the computer system to:
determine that a first data field corresponds to an operation that requires a first parameter;
determine first data that is accessible to a first entity and second data that is not accessible to the first entity;
obtain, over a network, first access information associated with the first entity from a first client system via a first executable instance of a user application during a launch of the first executable instance, the first executable instance being hosted on the first client system;
determine, based on the first access information, the first data being determined to be accessible to the first entity and the second data being determined to not be accessible to the first entity, first application metadata associated with the first entity from among a set of application metadata during the launch of the first executable instance, wherein:
the first application metadata indicates a first set of data fields that correspond to the first data accessible to the first entity, and
the first application metadata does not indicate that the first data field is to be loaded by the launch of the first executable instance based on the second data corresponding to the first parameter;
provide the first application metadata to the first client system, the first application metadata causing the first set of data fields to be loaded for a user interface of the first executable instance during the launch of the first executable instance; and
provide second application metadata to a second client system during the launch of a second executable instance of the user application that is overlapping in time with the launch of the first executable instance, the second application metadata indicating a second set of data fields that correspond to third data accessible to a second entity, the second executable instance (i) being a different instance from the first executable instance and (ii) being hosted on the second client system, the second application metadata causing the second set of data fields to be loaded for a user interface of the second executable instance during the launch of the second executable instance.

13. The system of claim 12, wherein the computer program instructions, when executed, further cause the computer system to:
obtain a request for the first set of data fields and the first data field to be made accessible to the first entity; and
generate the first application metadata based on (i) the request and (ii) one or more permissions associated with the first entity indicated by the first access information such that the first application metadata is generated to indicate loading of the first set of data fields based on the request, but does not indicate that the first data field is to be loaded at the launch of the first executable instance based on the first entity not having access to the second data corresponding to first parameter.

14. The system of claim 12, wherein the computer program instructions, when executed, further cause the computer system to:
obtain, over the network, second access information associated with the second entity via the second executable instance during the launch of the second executable instance; and
determine, based on the second access information, second application metadata associated with the second entity for the user interface of the second executable instance from among the set of application metadata during the launch of the second executable instance.

15. A non-transitory computer readable medium storing computer program instructions that, when executed by one or more processors, effectuate operations comprising:
determining that a first data field corresponds to an operation that requires a first parameter;
determining first data that is accessible to an entity and second data that is not accessible to the entity, wherein the second data corresponds to the first parameter;
obtaining, based on the first data being determined to be accessible to the entity and the second data being determined to not be accessible to the entity, application metadata associated with the entity during a launch of a first executable instance of a user application hosted by a computer system, wherein the application metadata indicates data fields that correspond to the first data accessible to the entity, and wherein the application metadata does not indicate that the first data field is to be loaded during the launch of the first executable instance based on the second data not being accessible to the entity; and
causing, based on the application metadata, loading of the data fields for a user interface of the first executable instance during the launch of the first executable instance such that at least some of the data fields are to be presented via the user interface of the first executable instance.

16. The non-transitory computer readable medium of claim 15, wherein:
the operation requires the first parameter and a second parameter;
the first data corresponds to the second parameter;
the second data corresponds to the first parameter; and
the application metadata is obtained further based on the first data corresponding to the second parameter and the second data corresponding to the first parameter.

17. The non-transitory computer readable medium of claim 15, wherein obtaining the application metadata comprises:
generating the application metadata based on the first data being determined to be accessible to the entity, the second data being determined to not be accessible to the entity, the second data corresponding to the first parameter, and the first data corresponding to a second parameter, wherein the operation with which the first data field corresponds further requires the second parameter.

18. The non-transitory computer readable medium of claim 15, wherein the operations further comprise:
obtaining access information associated with the entity via the first executable instance during the launch of the first executable instance, wherein the application metadata is obtained based on the access information.

19. The non-transitory computer readable medium of claim 15, wherein obtaining the application metadata comprises:
obtaining the application metadata from among a set of application metadata during the launch of the first executable instance, wherein the set of application metadata comprises the application metadata and additional application metadata associated with an additional entity.

20. The non-transitory computer readable medium of claim 19, wherein:
the additional entity is associated with an additional computer system that hosts a second executable instance of the application;
the additional application metadata indicates second data fields to be loaded by a user interface of the second executable instance during the launch of the second executable instance;
third data is accessible to the additional entity;
the third data corresponds to the first parameter;
the additional application metadata indicates that the first data field is to be loaded during the launch of the second executable instance; and
the second data fields comprise the first data field.

21. The non-transitory computer readable medium of claim 15, wherein causing the data fields to be loaded for the user interface of the first executable instance during the launch of the first executable instance such that at least some of the data fields are to be presented via the user interface of the first executable instance.

* * * * *